(12) United States Patent
Shin et al.

(10) Patent No.: US 10,054,359 B2
(45) Date of Patent: Aug. 21, 2018

(54) COOLING TOWER MECHANICAL SUPPORT

(71) Applicant: Baltimore Aircoil Company, Inc., Jessup, MD (US)

(72) Inventors: Yoon Shin, Ellicott City, MD (US); Kevin Egolf, Hampstead, MD (US); David Andrew Aaron, Reisterstown, MD (US)

(73) Assignee: BALTIMORE AIRCOIL COMPANY, INC., Jessup, MD (US)

( * ) Notice: Subject to any disclaimer, the term of this patent is extended or adjusted under 35 U.S.C. 154(b) by 0 days.

(21) Appl. No.: 15/296,781

(22) Filed: Oct. 18, 2016

(65) Prior Publication Data
US 2018/0106528 A1  Apr. 19, 2018

(51) Int. Cl.
*F25D 23/00* (2006.01)
*F16M 1/04* (2006.01)

(52) U.S. Cl.
CPC ............. *F25D 23/006* (2013.01); *F16M 1/04* (2013.01)

(58) Field of Classification Search
CPC ................................ F25D 23/006; F16M 1/04
USPC ........................................ 248/581, 672, 640
See application file for complete search history.

(56) References Cited

U.S. PATENT DOCUMENTS

| | | | | |
|---|---|---|---|---|
| 2,232,456 A | * | 2/1941 | Hewetson | F04B 39/0044 248/581 |
| 2,718,097 A | * | 9/1955 | Bradley | B24B 3/42 451/141 |
| 3,229,424 A | * | 1/1966 | Fairchok | B24B 21/14 165/47 |
| 3,442,494 A | * | 5/1969 | Anderson | F28C 1/02 261/109 |
| 3,702,741 A | * | 11/1972 | Goettl | F04D 25/02 415/206 |
| 3,784,171 A | | 1/1974 | Engalitcheff, Jr. et al. | |
| 4,485,591 A | * | 12/1984 | Bolin | B24B 3/42 451/141 |
| 4,601,684 A | | 7/1986 | Geary et al. | |
| 4,635,481 A | * | 1/1987 | Curchod | G01M 1/06 73/460 |
| 7,275,735 B2 | | 10/2007 | Brenneke et al. | |
| 9,080,645 B2 | * | 7/2015 | Hood | F01C 21/007 |
| 2010/0230570 A1 | * | 9/2010 | Vosbikian | A01K 39/014 248/311.2 |
| 2015/0204425 A1 | * | 7/2015 | Lindsay | F16H 7/14 474/117 |
| 2016/0024833 A1 | | 1/2016 | Miller | |

* cited by examiner

*Primary Examiner* — Muhammad Ijaz
(74) *Attorney, Agent, or Firm* — AMSTED Industries Incorporated

(57) ABSTRACT

A motor mount and fan sheave assembly is provided comprising two main structural supports, with a motor mount attached to the two main structural supports such that the motor mount can slide along the two main structural supports. A motor is affixed to the motor mount, and a fan sheave affixed to the two main structural supports. A motor sheave extends from the motor, and a belt spans between the motor sheave and the fan sheave. A threaded rod passes through a receiving opening in the motor mount, such that wherein upon movement of the adjusting rod, the motor mount slides along the two main structural supports.

4 Claims, 5 Drawing Sheets

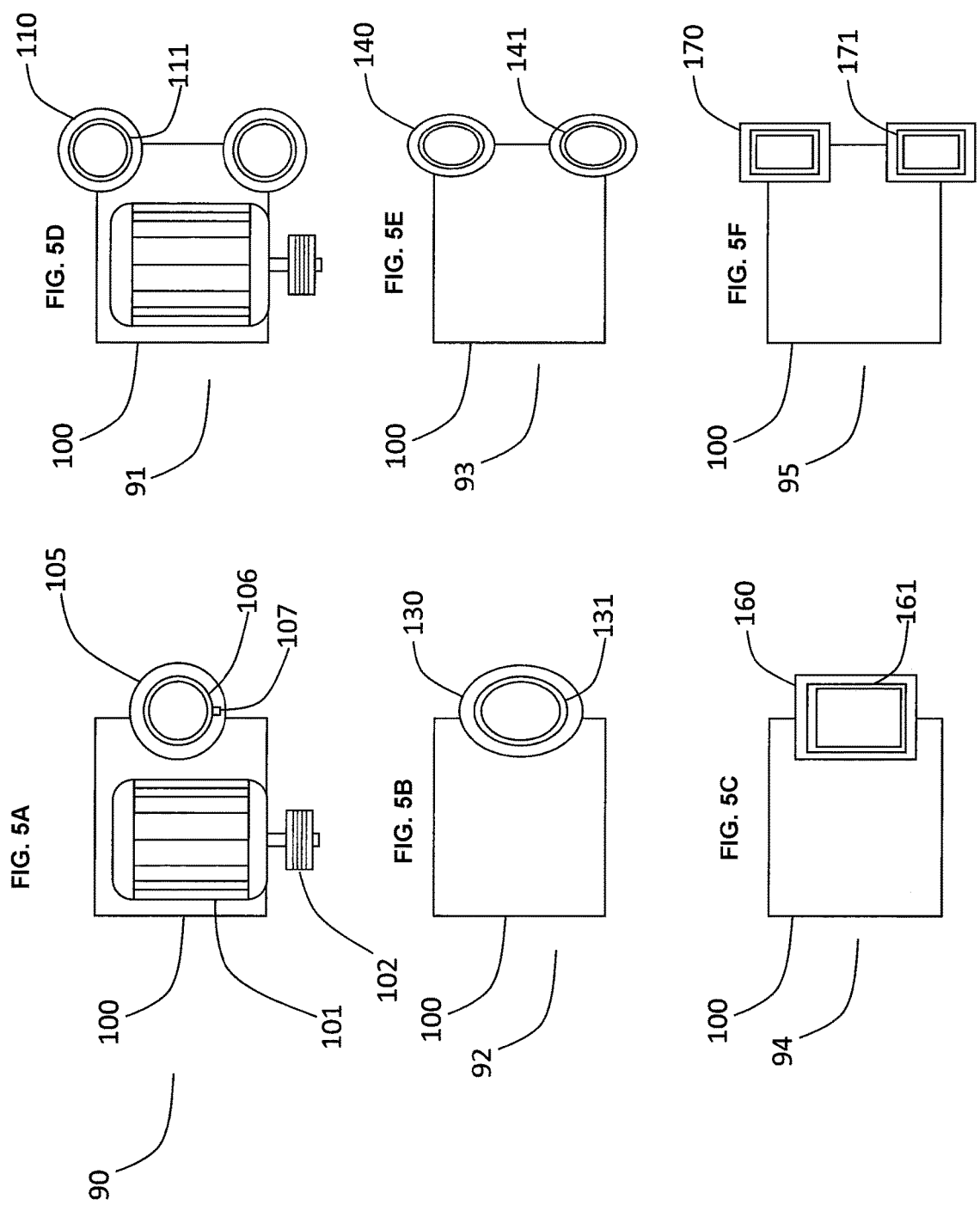

COOLING TOWER MECHANICAL SUPPORT

BACKGROUND OF THE INVENTION

The present invention relates generally to an improved mechanical equipment support system that is used within a heat exchange apparatus such as a cooling tower, closed circuit fluid cooler, fluid heater, condenser, evaporator, thermal storage system, air cooler or air heater.

The mechanical equipment support system includes a mechanical equipment support, fan assembly, belt, bearings, motor, motor mount, and adjustment rod.

A mechanical equipment system is needed to hold the fan assembly in place within the heat exchange apparatus and is often used to hold the fan motor and motor mount in place.

The mechanical equipment support usually sits inside the heat exchange apparatus but could also be located outside of the heat exchange apparatus. Because the fan and motor tend to be heavy and often produce vibration, the mechanical equipment support system is typically made out of heavy gage metal and tends to be expensive; therefore reducing the number of parts, ease of assembly and manufacturing cost could have a large impact on the overall cost of the heat exchange apparatus.

In addition to lowering the manufacturing cost, providing ease of maintenance is important. In addition, it would be advantageous to make the structure of the mechanical support system with a streamlined shape to allow more air to flow around the assembly. When the fan belt that connects the fan sheave to the fan sheave wears out or becomes loose, being able to adjust the belt tension without loosening many nuts and bolts helps to increase the ease of maintenance and improves in the safety when belt adjustment or replacement is needed.

SUMMARY OF THE INVENTION

The present invention provides an improved mechanical support system that is used in any heat exchange apparatus such as a cooling tower, closed circuit fluid cooler, fluid heater, condenser, evaporator, thermal storage system, air cooler or air heater.

The mechanical equipment support is a structural assembly that is used to hold air moving mechanical components within or outside of the heat exchange apparatus. The air moving mechanical components typically include a fan assembly, fan belt, motor, motor and fan sheaves and motor mount.

The fan assembly and motor are usually oriented such that their spinning axes are parallel to each other. The fan belt is wrapped around both a motor sheave and fan assembly sheave so that when the motor spins, the fan assembly also spins being driven by the motor.

The fan belt will loosen over time and need to be tightened. Belt tightening can be achieved by moving the motor away from the fan assembly. This movement necessitates either a sliding mechanism or a pivoting mechanism so that the motor can move away from the fan assembly.

Typically, the motor slides on a motor mount and the motor mount is either fixed to the mechanical equipment support or fixed directly to heat exchange apparatus by either welding, using fasteners, or both. Another typical design could be where motor is fixed to a motor mount which slides on the mechanical equipment support. After the motor mount is slid to a desired location, fasteners are used to fix the motor mount to the mechanical equipment support.

An adjusting rod such as a threaded rod can be used in both designs to control the sliding distance of the motor.

This invention deals with simplifying the sliding mechanism to reduce cost, increase the ease of maintenance and provide for a safer way to tighten or replace the belts. The fan sheave assembly and motor sheave assembly are attached to the same support tube.

In a preferred embodiment of this invention, the mechanical equipment support is made of two separated, parallel round tubes which nest with motor mount's two larger parallel round tubes, creating a tube-in-tube design. The motor is fixed to the motor mount and the motor mount slides on the round tubes of mechanical equipment support. Because of the tube-in-tube design, the mechanical equipment support's freedom of movement in any other direction other than the belt tightening direction is limited and therefore fasteners are not needed to clamp down the motor mount. By deleting the fasteners, the operator can more quickly and safely adjust the belt tension and thus the maintenance becomes easier.

By using the mechanical equipment support as a mechanical components holder, its tube surface as a sliding surface, and its tube geometry as a motor mount movement restrictor, both the motor mount sliding mechanism and fasteners needed for clamping the motor mount to the mechanical equipment support can be deleted, thus lowering the manufacturing cost.

BRIEF DESCRIPTION OF THE DRAWINGS

In the drawings,

FIGS. 5A-F are perspective views of motor mounts in accordance with the present invention.

DESCRIPTION OF THE PREFERRED EMBODIMENT

Figure 1:
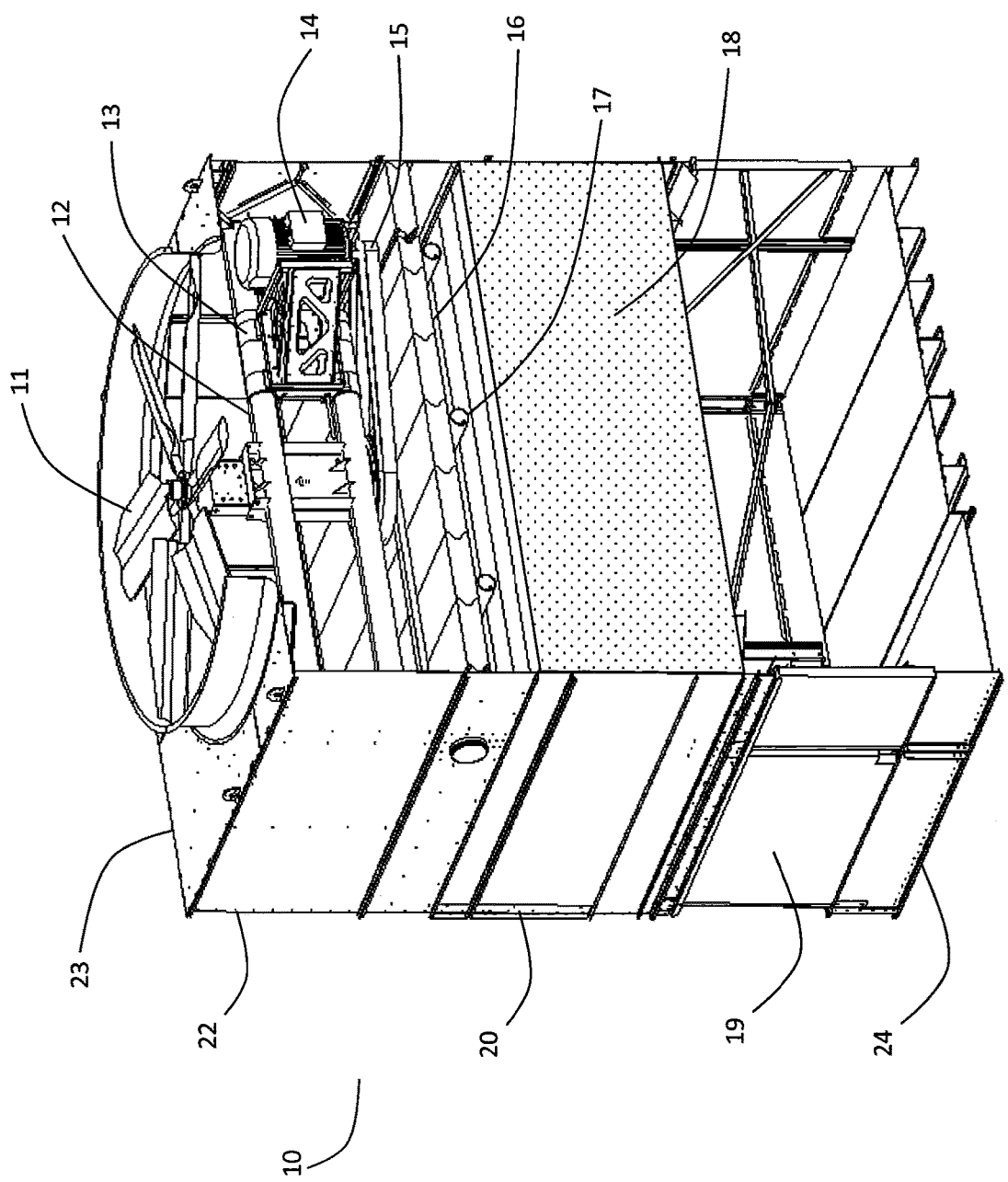
FIG. 1 is a perspective view of a heat exchanger in accordance with the present invention.

Referring now to FIG. 1 of the drawings, an embodiment of the present invention is shown in a cutaway view generally as heat exchanger 10.

Heat exchanger 10 is typically comprised of fan assembly 11, mechanical equipment support 12, motor mount 13, motor 14, fan belt 15, drift eliminator 16, spray section 17, heat transfer media 18, air inlet louvers 19, fill casing 20, fan section 22, fan deck 23 and basin 24.

When fan assembly 11 is rotated by motor 14, ambient air enters heat exchanger 10 through air inlet louvers 19, travels upward through heat transfer media 18, through drift eliminator 16, into fan section 22, passes mechanical equipment support 12, passes fan assembly 11 and exits heat exchanger 10 through the opening in fan deck 23. Spray water comes out of the nozzles in spray section 17, flows down heat transfer media 18, falls into basin 24 and exits heat exchanger 10.

Fan belt 15 wraps around the sheaves of both motor 14 and fan assembly 11. Fan assembly 11 and motor mount 13 are held in place by mechanical equipment support 12. Mechanical equipment support is attached to fan section 22.

Figure 2:
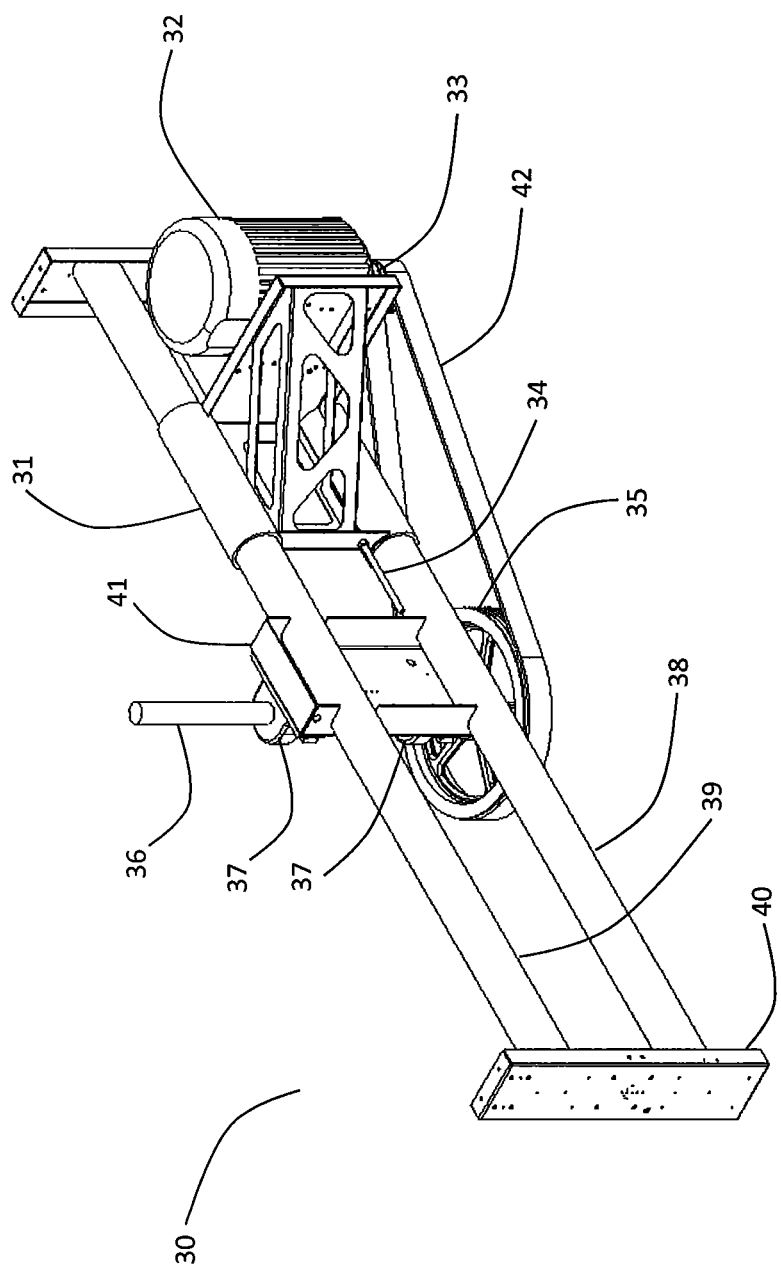
FIG. 2 is a perspective view of a mechanical equipment support in accordance with the present invention.

Referring now to FIG. 2 of the drawings, mechanical equipment support 30 is shown with motor mount 31, motor 32, motor sheave 33, all thread 34, fan sheave 35, fan shaft 36, bearing 37, upper tube 39, end plate 40, fan bracket 41 and belt 42. Note that the fan is not shown in the assembly and can be any kind of fan desired. Mechanical equipment support 30 is generally comprised of lower tube 38, upper tube 39, two end plates 40 and fan bracket 41 welded together. Lower tube 38 and upper tube 39 are parallel to each other and could be made of steel, stainless steel, aluminum, or other materials. The surface of lower tube 38 and upper tube 39 are generally smooth and free of burrs. Depending on the configurations of heat exchanger, mechanical equipment support 30 could be either in horizontal or in vertical orientation.

Fan shaft 36 spins within bearings 37, which are bolted to fan bracket 41. Fan sheave 35 is attached to fan shaft 36. Motor 32 is bolted to motor mount 31, which slides on the surfaces of lower tube 38 and upper tube 39 of mechanical equipment support 30 and is connected to all thread 34 in such way that when all thread 34 is rotated by an operator, motor mount 31 slides in a direction either closer to or farther away from fan sheave 35 depending on the direction of all thread 34 rotation. When motor 32 is moved farther away from fan sheave 35, belt 42 that is wrapped around fan sheave 35 and motor sheave 33 becomes tighter. By moving motor 32 closer to fan sheave 35, belt 42 could be loosened and removed when needing to be replaced. Because upper tube 39 and lower tube 38 are welded to end plates 40 and fan bracket 41, all of these components form one solid structure that resists the cantilevered moment caused by gravity pulling on the motor 32 which is offset from mechanical equipment support 30.

Figure 3:
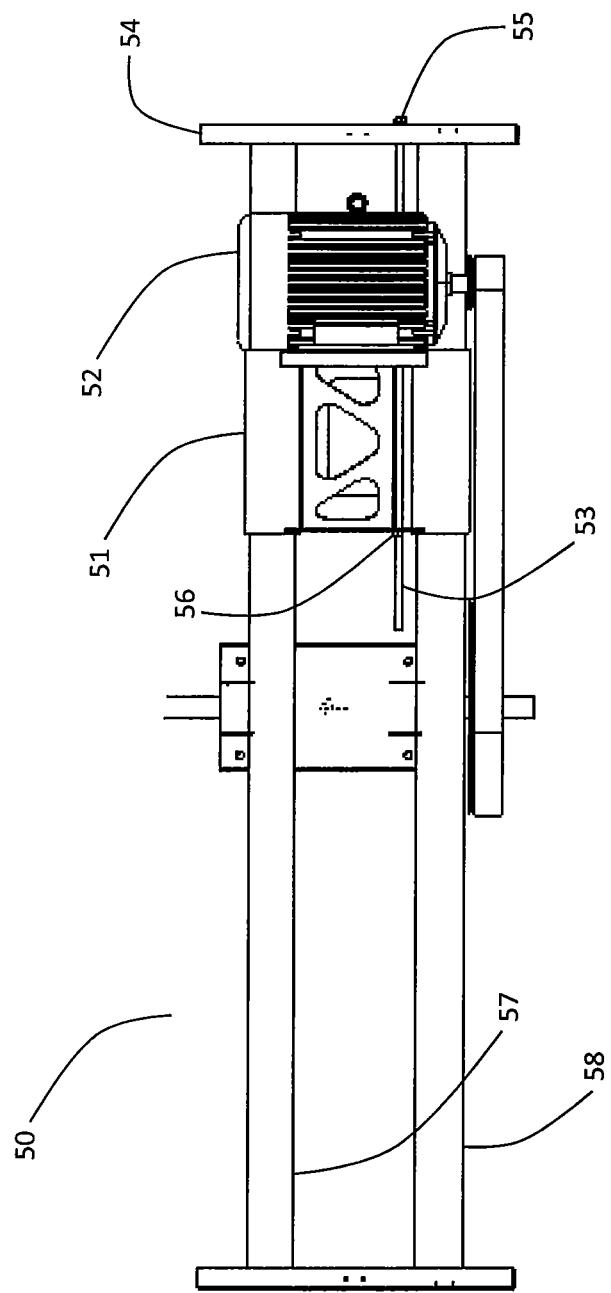
FIG. 3 is a side view of a mechanical equipment support in accordance with the present invention.

Referring now to FIG. 3 of the drawings, mechanical equipment support 50 is shown with motor mount 51, motor 52, all thread rod 53, end plate 54, all thread end nut 55, motor mount all thread nut 56, upper tube 57 and lower tube 58. All thread 53 could be rotated by turning all thread end nut 55. All thread nut 55 may be welded or a hole drilled and a cotter pin used to affix it the all thread rod 53. Other length adjusting mechanisms may also be used. Motor mount all thread nut 56 is welded to motor mount 51. When all thread 53 is rotated, it screws into or out of motor mount all thread nut 56 and motor mount 51 glides along upper tube 57 and lower tube 58. Any form of lubricant could be applied to upper tube 57 and lower tube 58 so that motor mount 51 could slide more easily.
Teflon or other material may be added to the slide tube to assist in having motor mount 51 slide easier over upper and lower slide tube 57 and 58 respectively.

Figure 4:
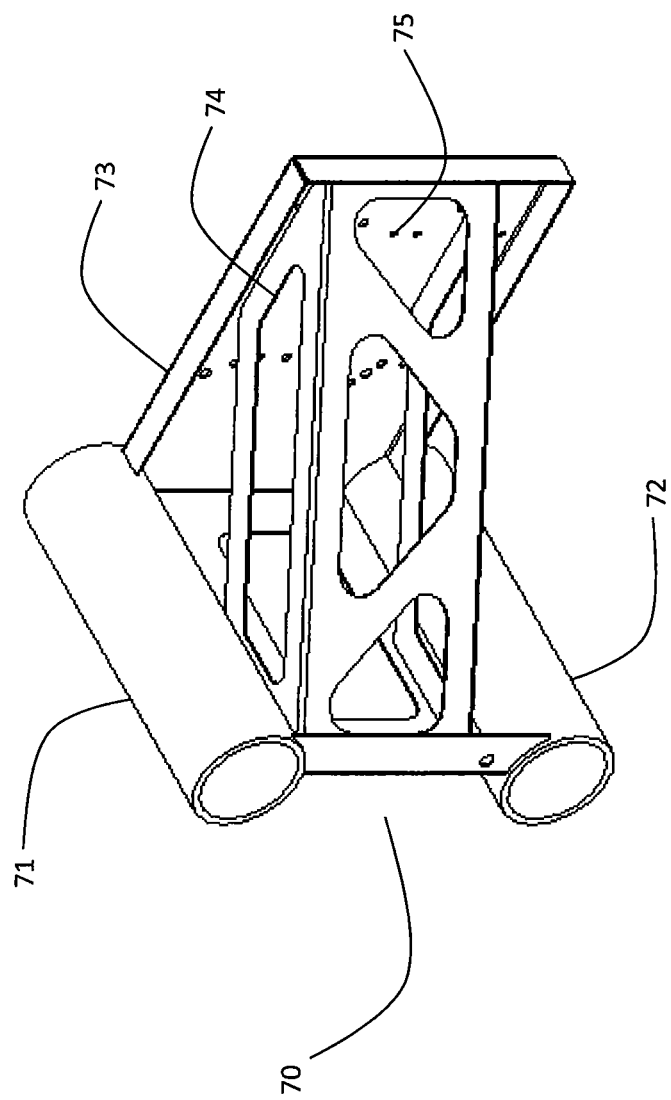
FIG. 4 is a perspective view of a motor mount in accordance with the present invention.

Referring now to FIG. 4 of the drawings, motor mount 70 is shown. Motor mount 70 is comprised of upper slide tube 71, lower slide tube 72, main plate bracket 73 and stiffener 74. All of these components are welded together to form a very rigid motor mount 70. Within the main plate bracket 73, various holes 75 have been cut out to accommodate various size motors.

Referring now to embodiment 90 of FIG. 5A, main plate bracket 100 is shown with motor 101 mounted to it and with driver sheave 102 attached to motor 101. Cylindrical slide tube 105 is typically welded to main plate bracket 100 which slides on cylindrical mounting tube 106. Note that mounting tube 106 has a sliding rectangular shaped keyway 107 which matches slide tube 105. Keyway 107 prevents rotation of sliding tube 105 about mounting tube 106. Embodiment 91 shown in FIG. 5D employs two cylindrical mounting tubes 111 with sliding tube 110. Embodiment 92 shown in FIG. 5B employs one streamline shaped mounting tube and sliding tube 130 attached to main plate bracket 100. Embodiment 93 shown in FIG. 5E employs two streamline shaped sliding tubes 140 and two streamline shaped mounting tubes 141. Embodiment 94 shown in FIG. 5C employs one rectangular shaped mounting tube 161 with rectangular shaped sliding tube 160 attached to main plate bracket 100 and embodiment 95 shown in FIG. 5F employs two rectangular shaped mounting tubes 171 with rectangular shaped sliding tubes 170 attached to main plate bracket 100. In all these embodiments, the main feature is that all of these components form one solid structure that resists the cantilevered moment caused by gravity and the pulling force of the tightened belt between the motor and fan sheave.

What is claimed is:

1. A motor mount and fan sheave assembly comprising:
   one main structural support,
   a motor mount attached to the main structural support such that the motor mount can slide along the main structural support,
   a motor affixed to the motor mount,
   a fan sheave extending from fan shaft affixed to the main structural support,
   a motor sheave extending from the motor,
   a belt spanning between the motor sheave and the fan sheave,
   an adjusting rod passing through a receiving opening in the motor mount,
   wherein upon movement of the adjusting rod, the motor mount slides along the main structural support,
   the main structural support is comprised of a cylindrical support tube and
   a keyway such that the motor mount cannot rotate about an axis of the main structural support
   and the motor mount includes a cylindrical mounting tube with a mating keyway such that the cylindrical mounting tube can freely slide about the keyway,
   wherein the cylindrical mounting tube of the motor mount surrounds a portion of the cylindrical support tube,
   the motor mount comprises a structural section affixed to and extending between the cylindrical mounting tube,
   the motor is affixed to the structural section of the motor mount, and
   wherein the fan sheave is comprised of a main section affixed to and extending between the main structural support.

2. The motor mount and fan sheave of claim 1 wherein the adjusting rod is comprised of a threaded rod having an end nut that assists in rotating the threaded rod.

3. The motor mount and fan sheave assembly of claim 1 wherein
   the main structural support is comprised of a generally cylindrical support tube,
   and the motor mount includes a generally cylindrical mounting tube,
   wherein the generally cylindrical mounting tube of the motor mount surrounds a portion of the generally cylindrical support tube.

4. The motor mount and fan sheave assembly of claim 1 wherein
   the main structural support is comprised of a rectangular shaped support tube,
   and the motor mount includes a rectangular shaped mounting tube, wherein the rectangular shaped mounting tube of the motor mount surrounds a portion of the rectangular shaped support tube.

\* \* \* \* \*